US010672215B2

(12) United States Patent
Dominguez et al.

(10) Patent No.: US 10,672,215 B2
(45) Date of Patent: Jun. 2, 2020

(54) DATA AUTHENTICATION AND PROVISIONING METHOD AND SYSTEM

(75) Inventors: Benedicto H. Dominguez, San Bruno, CA (US); Thomas J. Manessis, Pacifica, CA (US); Melody L. Rutherford, San Francisco, CA (US); Sandra Salvatori, Sausalito, CA (US); Janet T. Roth, Oakland, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 1944 days.

(21) Appl. No.: 13/198,447

(22) Filed: Aug. 4, 2011

(65) Prior Publication Data

US 2012/0066130 A1 Mar. 15, 2012

Related U.S. Application Data

(63) Continuation of application No. 10/660,263, filed on Sep. 10, 2003, now Pat. No. 8,019,691.

(Continued)

(51) Int. Cl.
*G07F 7/10* (2006.01)
*G06Q 20/34* (2012.01)
(Continued)

(52) U.S. Cl.
CPC ............ *G07F 7/1008* (2013.01); *G06F 21/33* (2013.01); *G06Q 20/02* (2013.01); *G06Q 20/04* (2013.01);
(Continued)

(58) Field of Classification Search
None
See application file for complete search history.

(56) References Cited

U.S. PATENT DOCUMENTS 5,163,098 A 11/1992 Dahbura
5,267,315 A 11/1993 Narita et al.
(Continued)

FOREIGN PATENT DOCUMENTS

AU 2001259080 B2 10/2001
AU 2002215278 6/2002
(Continued)

OTHER PUBLICATIONS

Singapore Examination Report dated Apr. 9, 2009 in Application No. 200701817-9.
(Continued)

*Primary Examiner* — Jamie R Kucab
(74) *Attorney, Agent, or Firm* — Kilpatrick Townsend & Stockton LLP

(57) ABSTRACT

Techniques for authenticating the identity and validating the profile of an individual ("a presenter") who presents him or herself to another party ("an acceptor") as having a certain identity and having certain corresponding profile data are described. The invention can be advantageously used in Internet transactions where such authentication and validation is difficult to perform. The techniques of the present invention allow the trusted party to give a definitive answer regarding the authentication of identity and validity of profile data. Other services such as profile data provisioning and profile data updating can also be performed.

20 Claims, 2 Drawing Sheets

Data Authentication
Services System and
Message Flows

Related U.S. Application Data

(60) Provisional application No. 60/410,032, filed on Sep. 10, 2002, provisional application No. 60/469,284, filed on May 9, 2003.

(51) Int. Cl.
| | |
|---|---|
| *G06Q 20/40* | (2012.01) |
| *G06Q 20/08* | (2012.01) |
| *G06Q 20/04* | (2012.01) |
| *G06Q 20/02* | (2012.01) |
| *G06F 21/33* | (2013.01) |
| *G07C 9/22* | (2020.01) |

(52) U.S. Cl.
CPC ....... *G06Q 20/0855* (2013.01); *G06Q 20/341* (2013.01); *G06Q 20/40* (2013.01); *G06Q 20/401* (2013.01); *G06Q 20/4014* (2013.01); *G06Q 20/40975* (2013.01); *G07C 9/22* (2020.01)

(56) References Cited

U.S. PATENT DOCUMENTS

| | | | |
|---|---|---|---|
| 5,420,926 A | 5/1995 | Low et al. | |
| 5,442,342 A | 8/1995 | Kung | |
| 5,485,510 A | 1/1996 | Colbert | |
| 5,544,322 A | 8/1996 | Cheng et al. | |
| 5,671,279 A | 9/1997 | Elgamal | |
| 5,684,950 A | 11/1997 | Dare et al. | |
| 5,712,913 A | 1/1998 | Chaum | |
| 5,778,065 A | 7/1998 | Hauser et al. | |
| 5,793,028 A | 8/1998 | Wagener et al. | |
| 5,815,665 A | 9/1998 | Teper et al. | |
| 5,826,241 A | 10/1998 | Stein et al. | |
| 5,826,245 A | 10/1998 | Sandberg-Diment | |
| 5,835,896 A | 11/1998 | Fisher et al. | |
| 5,845,070 A | 12/1998 | Ikudome | |
| 5,845,265 A | 12/1998 | Woolston | |
| 5,883,810 A | 3/1999 | Franklin et al. | |
| 5,884,272 A | 3/1999 | Walker et al. | |
| 5,903,721 A | 5/1999 | Sixtus | |
| 5,903,878 A | 5/1999 | Talati et al. | |
| 5,903,882 A | 5/1999 | Asay et al. | |
| 5,909,492 A | 6/1999 | Payne et al. | |
| 5,930,777 A | 7/1999 | Barber | |
| 5,970,475 A | 10/1999 | Barnes et al. | |
| 5,991,738 A | 11/1999 | Ogram | |
| 5,999,596 A | 12/1999 | Walker et al. | |
| 6,016,476 A | 1/2000 | Maes et al. | |
| 6,029,141 A | 2/2000 | Bezos et al. | |
| 6,047,268 A | 4/2000 | Bartoli et al. | |
| 6,052,675 A | 4/2000 | Checchio | |
| 6,070,241 A | 5/2000 | Edwards et al. | |
| 6,076,078 A | 6/2000 | Camp et al. | |
| 6,078,902 A | 6/2000 | Schenkler | |
| 6,098,053 A | 8/2000 | Slatter et al. | |
| 6,122,624 A | 9/2000 | Tetro et al. | |
| 6,167,378 A | 12/2000 | Webber, Jr. | |
| 6,202,051 B1 | 3/2001 | Woolston | |
| 6,205,437 B1 | 3/2001 | Gifford | |
| 6,236,981 B1 | 5/2001 | Hill | |
| 6,243,691 B1 | 6/2001 | Fisher et al. | |
| 6,247,129 B1 | 6/2001 | Keathley et al. | |
| 6,260,024 B1 | 7/2001 | Shkedy | |
| 6,270,011 B1 | 8/2001 | Gottfried | |
| 6,327,578 B1 | 12/2001 | Linehan | |
| 6,327,587 B1 | 12/2001 | Forster | |
| 6,381,316 B2 | 4/2002 | Joyce et al. | |
| 6,427,132 B1 | 7/2002 | Bowman-Amuah | |
| 6,629,081 B1 | 9/2003 | Cornelius et al. | |
| 6,675,153 B1 | 1/2004 | Cook et al. | |
| 6,704,714 B1 | 3/2004 | O'Leary et al. | |
| 6,735,572 B2 | 5/2004 | Landesmann | |
| 6,820,202 B1 | 11/2004 | Wheeler et al. | |
| 6,839,692 B2 * | 1/2005 | Carrott | G06Q 20/10 235/380 |
| 6,879,965 B2 | 4/2005 | Fung et al. | |
| 6,889,325 B1 * | 5/2005 | Sipman | G06Q 20/04 380/268 |
| 6,931,382 B2 * | 8/2005 | Laage | G06Q 20/02 705/64 |
| 6,938,019 B1 | 8/2005 | Uzo | |
| 6,941,282 B1 | 9/2005 | Johnson | |
| 6,941,285 B2 * | 9/2005 | Sarcanin | G06Q 20/02 235/379 |
| 7,069,249 B2 | 6/2006 | Stolfo et al. | |
| 7,177,838 B1 | 2/2007 | Ling | |
| 7,177,849 B2 | 2/2007 | Fieschi et al. | |
| 7,249,093 B1 | 7/2007 | King | |
| 7,318,048 B1 | 1/2008 | King | |
| 7,356,502 B1 | 4/2008 | LaBadie et al. | |
| 7,499,889 B2 | 3/2009 | Golan | |
| 8,762,283 B2 | 6/2014 | Gerber et al. | |
| 2001/0014158 A1 | 8/2001 | Baltzley | |
| 2001/0029496 A1 | 10/2001 | Otto et al. | |
| 2001/0039535 A1 | 11/2001 | Tsiounis et al. | |
| 2001/0039536 A1 | 11/2001 | Mori et al. | |
| 2001/0042051 A1 | 11/2001 | Barrett et al. | |
| 2001/0044787 A1 | 11/2001 | Shwartz et al. | |
| 2001/0051902 A1 | 12/2001 | Messner | |
| 2001/0054003 A1 | 12/2001 | Chien et al. | |
| 2002/0007352 A1 | 1/2002 | Fieschi et al. | |
| 2002/0019811 A1 | 2/2002 | Lapsley et al. | |
| 2002/0023059 A1 | 2/2002 | Bari et al. | |
| 2002/0069174 A1 | 6/2002 | Fox et al. | |
| 2002/0091646 A1 | 7/2002 | Lake et al. | |
| 2002/0111919 A1 * | 8/2002 | Weller | G06Q 20/02 705/67 |
| 2002/0128977 A1 | 9/2002 | Nambiar et al. | |
| 2002/0169720 A1 * | 11/2002 | Wilson | G06Q 20/10 705/44 |
| 2002/0174062 A1 | 11/2002 | Sines et al. | |
| 2002/0188574 A1 | 12/2002 | Niwa | |
| 2002/0194138 A1 * | 12/2002 | Dominguez | G06Q 20/02 705/64 |
| 2003/0046541 A1 | 3/2003 | Gerdes | |
| 2003/0097451 A1 | 5/2003 | Bjorksten et al. | |
| 2003/0120615 A1 | 6/2003 | Kuo | |
| 2003/0144952 A1 | 7/2003 | Brown et al. | |
| 2003/0149781 A1 | 8/2003 | Yared et al. | |
| 2003/0200184 A1 * | 10/2003 | Dominguez | G06Q 20/02 705/78 |
| 2003/0208684 A1 | 11/2003 | Camacho et al. | |
| 2003/0212642 A1 | 11/2003 | Weller et al. | |
| 2004/0002903 A1 | 1/2004 | Stolfo et al. | |
| 2004/0019563 A1 | 1/2004 | Sines et al. | |
| 2004/0044627 A1 | 3/2004 | Russell et al. | |
| 2004/0078328 A1 | 4/2004 | Talbert et al. | |
| 2004/0083184 A1 * | 4/2004 | Tsuei | G06Q 10/08 705/74 |
| 2004/0177047 A1 | 9/2004 | Graves et al. | |
| 2004/0230536 A1 | 11/2004 | Fung et al. | |
| 2004/0243520 A1 | 12/2004 | Bishop et al. | |
| 2005/0065855 A1 | 3/2005 | Geller | |
| 2005/0131826 A1 | 6/2005 | Cook | |
| 2005/0192896 A1 | 9/2005 | Hutchison et al. | |
| 2006/0242058 A1 | 10/2006 | Torto | |
| 2012/0066129 A1 | 3/2012 | Dominguez et al. | |

FOREIGN PATENT DOCUMENTS

| | | |
|---|---|---|
| AU | 2003267149 | 3/2010 |
| AU | 2010202454 | 7/2012 |
| EP | 0 896 284 | 2/1999 |
| EP | 0 896 284 A | 2/1999 |
| EP | 1 271 435 A2 | 1/2003 |
| EP | 1546957 | 11/2016 |
| JP | 11-43780 | 11/1997 |
| JP | 10-313488 | 4/1998 |
| JP | 2000-184085 | 12/1998 |
| JP | 2000-236353 | 11/1999 |
| JP | 2000-076336 A | 3/2000 |

(56) References Cited

FOREIGN PATENT DOCUMENTS

| | | |
|---|---|---|
| JP | 2001-313979 | 4/2000 |
| JP | 2001-344550 | 6/2000 |
| JP | 2000-142398 | 9/2000 |
| JP | 2003-586704 | 2/2001 |
| JP | 2001-291032 | 3/2001 |
| JP | 2002-91473 | 6/2001 |
| SG | 152061 | 10/2011 |
| WO | 92/11598 A1 | 7/1992 |
| WO | 99/42961 | 8/1999 |
| WO | 99/42961 A | 8/1999 |
| WO | 99/46881 A1 | 9/1999 |
| WO | 00/45349 A1 | 8/2000 |
| WO | 00/67143 A2 | 11/2000 |
| WO | 01/07873 A2 | 2/2001 |
| WO | 01/13275 | 2/2001 |
| WO | 01/13275 A1 | 2/2001 |
| WO | 01/37180 A1 | 5/2001 |
| WO | 01/48628 A2 | 7/2001 |
| WO | 01/63878 A1 | 8/2001 |
| WO | 01/67201 A2 | 9/2001 |
| WO | 01/69549 | 9/2001 |
| WO | 01/69549 A1 | 9/2001 |
| WO | 01/78493 A | 10/2001 |
| WO | 01/82190 A1 | 11/2001 |
| WO | 01/99378 A1 | 12/2001 |
| WO | 02/03285 | 1/2002 |
| WO | 02/03285 A1 | 1/2002 |
| WO | 02/21464 A2 | 3/2002 |
| WO | 02/44976 A2 | 6/2002 |
| WO | 03/107242 A1 | 12/2003 |
| WO | 2004025413 A2 | 3/2004 |
| WO | 2004/079603 A1 | 9/2004 |

OTHER PUBLICATIONS

European Extended Search Report; Application No. 09150401.9-1238; dated Apr. 9, 2009.
Mexican Office Action dated May 15, 2009; Application No. PA/A/2006/006158.
Translation of Mexican Office Action dated May 15, 2009; App No. PA/A2006/006158.
Search Report from corresponding Singapore Application No. 200701817-9, dated Jun. 23, 2008.
Written Opinion from corresponding Singapore Application 200701817-9, dated Jun. 23, 2008.
PCT/US03/28559; International Preliminary Examination Report; dated Jul. 25, 2005.
PCT/US03/28599; International Search Report; 02117/2005.
Supplementary European Search Report; dated Feb. 9, 2006; PCT/US03/28599.
Supplementary European Search Report; dated Mar. 31, 2005; European Patent Appl. No. 03726334.0.
Chambers; dated Nov. 3, 2008, 1pg. From http://www.credoreference.com/entry/1196447/.
J. Kohl and C. Neuman; "The Kerberos Network Authentication Service (V5)," 0911993; pp. 1-10, URL: http://www.ietf.org/rfc/rfc1510.txt, downloaded on Apr. 29, 2008.
Korean Patent Abstract; Publication No. 1020000012391 A; Mar. 6, 2000.
PCT/US03/28599; International Search Report; dated Feb. 17, 2005.
Prince, "Online Auctions at eBay" (Apr. 1999). Prima Publishing Rocklin, CA.
EBay. (Nov. 3, 1999). httg://web.archive.org/web/19991103051532/httg://www.ebay.com/. Retrieved online Aug. 18, 2004.
O'Mahony, Donald et al. "Electronic Payment Systems." 1997 Artech House Inc., Norwood, MA.
EBay. (Nov. 3, 1999). http://web.archive.org/web/19991103051532/httQ://www.ebay.com/. Retrieved online Aug. 18, 2004.
United States District Court for the Northern District of Texas; Civil Action No. CIV 3-03CV0976-L; "Defendants' Preliminary Invalidity Contentions"; *Starpay.com, L.L.C.*, Plaintiffs vs. *Visa International Service Associate and Visa U.S.A. Inc.*, Defendants; May 28, 2004.
Linn, "Practical Authentication for Distributed Computing," May 7-9, 1999, 1999 IEEE Computer Society Symposium on Research in Security and Privacy, Oakland, CA.
Sherman et al., "Secure Network Access Using Multiple Applications of AT&T's Smart Card," Sep./Oct. 1994, AT&T Technical Journal.
Leach, "Dynamic Authentication for Smartcards," 1995, Computers & Security, vol. 14, No. 5, pp. 385-389.
Ganesan, "The Yaksha Security System," Mar. 1996, Communications of the ACM, vol. 39, No. 3, pp. 55-60.
Zhou et al., "A Fair Non-Repudiation Protocol," May 6-8, 1996, 1996 IEEE Symposium on Security and Privacy, pp. 55-61 Oakland, CA.
Bakker, "Mutual Authentication with Smart Cards," May 10-11, 1999, Proceedings ofthe USENIX Workshop on Smartcard Technology (Smartcard '99), pp. 63-74, Chicago, Illinois.
http://www.orbiscom.com, Jun. 30, 2000.
Novell Debuts New DIGITALME in the Net, Oct. 6, 1999, http://www.digitalme.com.
European Patent Office Examination Report Issued in International Application 03 749 623.9-1238 dated May 18, 2012, 7 pages.
U.S. Appl. No. 13/198,395, "Notice of Allowance", dated Feb. 6, 2020, 11 pages.

\* cited by examiner

Data Authentication
Services System and
Message Flows

DATA AUTHENTICATION AND PROVISIONING METHOD AND SYSTEM

CROSS-REFERENCE TO RELATED APPLICATIONS

This application is a continuation patent application of U.S. patent application Ser. No. 10/660,263, filed Sep. 10, 2003, entitled "Data Authentication and Provisioning Method and System," which claims priority of U.S. provisional patent application Nos. 60/410,032 and 60/469,284, filed Sep. 10, 2002 and May 9, 2003, respectively, both entitled "Profile and Identity Authentication Services," which are hereby incorporated by reference.

This application is related to U.S. patent application Ser. No. 10/370,149, filed Feb. 19, 2003, entitled "Mobile Account Authentication Service," which claims priority of U.S. provisional patent application Nos. 60/373,702 and 60/405,869, filed on Apr. 17, 2002 and Aug. 23, 2002, respectively.

This application is related to U.S. patent application Ser. No. 10/156,271, filed May 24, 2002, and entitled "ONLINE ACCOUNT AUTHENTICATION SERVICE," which is a continuation-in-part to U.S. patent application Ser. No. 09/842,313 filed Apr. 24, 2001, entitled "On-Line Payer Authentication Service," which in turn claims priority of U.S. provisional patent application No. 60/199,727, filed Apr. 24, 2000 entitled "Visa Payer Authentication Service Description," all of which are hereby incorporated by reference.

FIELD OF THE INVENTION

The present invention relates generally to online transactions, and more specifically to techniques for authenticating and/or providing the identity and profile data of a presenter.

BACKGROUND OF THE INVENTION

During a transaction between two parties, each party typically wants assurance as to the authenticity of the identity and/or the data relating to the other party so to avoid a variety of problems, one of which is fraud. Such transactions can be either payment or non-payment in nature. In non-payment transactions, for example, one party may want to confirm the identity of the other party before disclosing certain information. On the other hand, during a payment transaction using a payment card (e.g., a credit, debit, or stored value card), it is important to verify a user's ownership of an account to avoid unauthorized use of the payment card.

Authentication procedures during transactions when two parties are interacting in each other's physical presence (referred to as "in-person" transactions) can involve verifying that the signature of a user matches the signature on an identification or a payment card. Another authentication procedure involves verifying that a photograph contained in a form of identification matches the physical appearance of the user.

However, online transactions are riskier because the "in-person" authentication procedures cannot be performed. Online transactions can be conducted through mediums such as but not limited to computers, mobile devices, telephones, or interactive television. Given the continued expected growth of electronic transactions, it is important to provide methods to authenticate the identity and profile data of individuals. Authentication techniques during online transactions will reduce the levels of fraud and disputes, which in turn will reduce the costs associated with each of these events. Prior systems used to authenticate users during online transactions have not been widely adopted because these systems were difficult to use, had complex designs, required significant up-front investment by system participants and lacked interoperability. Certain prior systems additionally required the creation, distribution and use of certificates by various entities involved in a transaction. Such use of certificates is known to be quite burdensome.

Current systems for authenticating the identity and/or the profile data of individuals online for non-payment transactions use existing databases of information to determine a likelihood that profile data entered by an individual is authentic. These systems operate by asking specific factual questions of which only a limited number of parties would know the answer. For example, such systems may ask for the exact amount of the presenter's latest payment for a specific bill (e.g., a mortgage payment). Such a question could also inquire about the last two digits of such a payment, rather than the entire amount. Using such questions, these service providers are able to determine the likelihood (e.g., a numerical percentage) that the actual individual provided the correct answers. Correct answers do not lead to a definitive indication that the actual individual entered the correct answer because the possibility exists that an imposter made a lucky guess as to the answer or that an imposter discovered the correct answer through secretive investigation. Unfortunately because of these possibilities, the current systems cannot provide definite indication as to authenticity of profile data. For example, Equifax (see www.econsumer.equifax.com) and Experion Systems (see www.experionsystems.com) provide such services.

In view of the foregoing, a system for authenticating the identity and profile data of an individual during an online transaction would be desirable. Such an authenticating system should be relatively easy to implement and use, require a minimal investment of resources, and provide a high level of interoperability between the system's participants.

BRIEF SUMMARY OF THE INVENTION

The present invention provides methods and systems for authenticating the identity and validating the profile data of an individual ("a presenter") who presents him or herself to another party ("an acceptor") as having a certain identity and having certain corresponding profile data. The invention can be advantageously used in Internet transactions where such authentication is difficult to perform. The techniques of the present invention allow the trusted party to give a definitive answer regarding the authentication of identity and profile data. Other capabilities such as profile data provisioning and profile updating can also be performed.

One aspect of the present invention pertains to a method for validating the profile data of the presenter during an on-line transaction. This method involves receiving profile data at the trusted party, comparing the profile data against reference data stored by the trusted party, notifying the acceptor by the trusted party that the profile data of the presenter is either authentic or erroneous. In one embodiment, the presenter communicates with the trusted party and the acceptor over the Internet. Another aspect of the invention pertains to a system for implementing the method for validating the profile data of the presenter.

Another aspect of the invention pertains to a method for providing profile data of the presenter during an on-line transaction. This method involves querying a trusted party for profile data and providing the profile data to the acceptor by the trusted party. Another aspect of the invention pertains to a system for implementing the method for providing the profile data.

These and other features and advantages of the present invention will be presented in more detail in the following specification of the invention and the accompanying figures, which illustrate by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

The present invention provides methods and systems for authenticating the identity and validating the profile data of an individual ("a presenter") who presents him or herself to another party ("an acceptor") as having a certain identity and having certain corresponding profile data. The acceptor can be a service provider, a government agency, a merchant, or any other entity that may need to authenticate the identity of the presenter before proceeding with a transaction. Authentication of identity refers to verifying the identity of a presenting party who purports to be a certain individual. Validating profile data pertains to validating that profile data provided by a presenter actually is associated with the presenter. Other capabilities such as profile data provisioning and profile updating can also be performed. These functions can be performed individually or in any combination with each other.

The invention can be advantageously used in Internet transactions where such authentication is difficult to perform. For instance, a presenter who is visiting a government website to gain access to government services may have to be authenticated beforehand by techniques of the present invention. In one embodiment, a trusted party interacts with the presenter to perform the authentication and then informs the acceptor as to authentication results. The techniques of the present invention allow the trusted party to give a definitive answer regarding the authenticity of identity.

System Components

Figure 1:
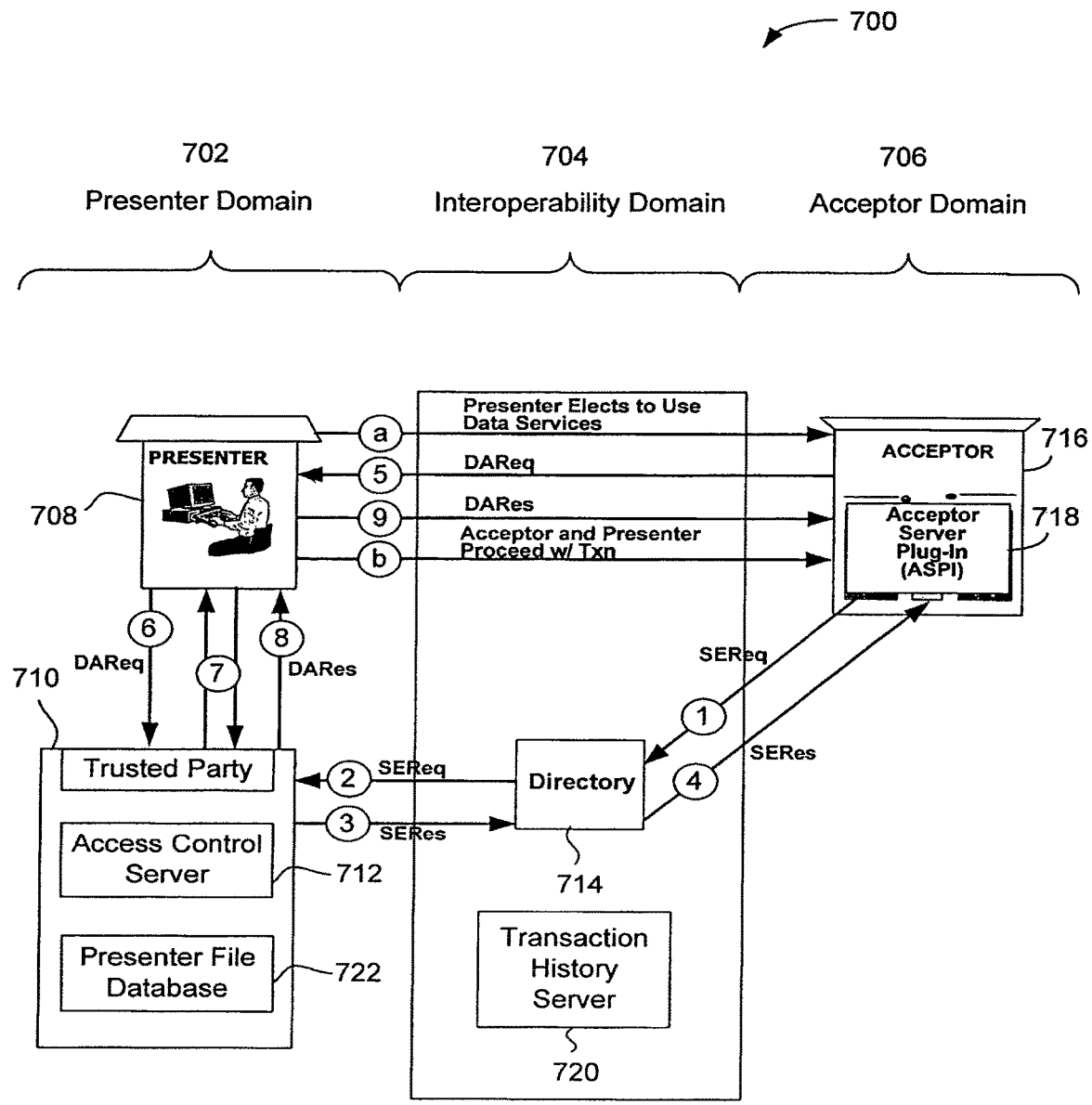
FIG. 1 shows a system architecture and the message flows for the data authentication services system according to one embodiment of the present invention.

FIG. 1 shows a system architecture and the message flows for the data authentication services system 700 according to one embodiment of the present invention. The system architecture aspect of FIG. 1 will be described in this section while the message flows, which describe the authentication process in more detail, will be described later in tandem with FIG. 2. The present invention can be used during online transactions, such as those that occur over the Internet.

The systems and message flows of the present invention are based upon and are similar to the system and message flows described in U.S. patent application Ser. Nos. 09/842,313, 10/156,271, and 10/370,149.

Data authentication services system 700 includes a presenter domain 702, an interoperability domain 704, and an acquirer domain 706. Within presenter domain 702 is a presenter 708, trusted party 710, and an access control server 712 maintained by trusted party 710, and a presenter file database 722. Presenter 708 is the user, individual, or consumer whose identity is being authenticated and whose data is being validated or provisioned. Presenter 708 can access system 700 using a variety of systems that range from super computers to mobile devices, such as cellular phones. Trusted party 710 is the entity that authenticates the identity and validates, provisions, or updates data relating to presenter 708. Trusted party 710 has an established relationship with presenter 708 and therefore has a reliable set of the presenter's profile data prior to a transaction that requires data services. For example, trusted party 710 can be a bank, a credit or debit card issuing bank, or a credit or debit card service organization (e.g., Visa). For example, this bank can be the issuing bank of a credit card that is used by this presenter. Presenter 708 can be a customer of this bank. As in this specific example, the relationship between presenter 708 and trusted party 710 usually is such that it can be trusted that the profile information relating to presenter 708 is accurately held by trusted party 710.

Access control server (ACS) 712 is a computer system that controls access to the data authentication services program, performs the requested data services, and provides digitally signed notifications to acceptors regarding the data services.

Presenter file database 722 is a database managed by the trusted party 710 that stores information relating to the presenters that are successfully enrolled in the data authentication services program. Such information includes program identity numbers, profile data, and passwords.

Within interoperability domain 704 is a directory server 714 and a transaction history server 720. Interoperability domain 704 includes components used by both the trusted party and the acceptor. Directory server 714 facilitates the process of determining whether a presenter 708 can utilize the data authentication services of the present invention. In many embodiments, directory server 714 will also route data authentication requests from acceptors 716 to specific ACS's 712. Directory server 714 can be operated by a service organization such as Visa. When the network maintained by Visa supports system 700, directory server 714 is referred to as the "Visa directory server." Transaction History Server 720 performs administrative functions that maintains records for supporting services such as billing, reporting, and dispute handling. In one embodiment, the Internet supports interoperability domain 704.

Finally, within acceptor domain 706 is an acceptor 716, which incorporates an acceptor server plug-in (ASPI) 718. Acceptor 716 is a service provider, a government agency, a merchant, or any other party participating in data authentication services system 700 in order to use the services provided by system 700. ASPI 718 is software utilized by acceptor 716 to interface with the other components of data authentication services system 700.

The respective relationship between presenter 708, trusted party 710, and acceptor 716 within data authentication services system 700 allows a wide range of possible services to be provided. Some of the various data services include: identity authentication, profile validation, profile data provisioning, and profile data updating. One implementation of profile validation operates to validate the address of a presenter and one implementation of profile data updating operates to update the account information of a presenter.

System 700 can be used in non-payment and in payment related transactions between presenter 708 and acceptor 706. In payment related transactions, additional operations such as authorization of debits and credits from financial accounts are also required. Additional systems such as issuer authorization and settlement systems are also required.

Presenter Enrollment Process

A presenter registers with a trusted party to be eligible to use the data authentication services program. Upon successful registration, a trusted party provides a presenter with a program identity number and an authenticating password, token, or other authenticating mechanism. A program identity number is a number that identifies presenters who are properly enrolled to use the authentication services program. A program identity number can be any type of number such as a random number or a number issued out of a series of numbers. In one embodiment of the invention, the program identity number can also be a payment card number. This is convenient in the case where presenter 708 is a payment card cardholder and trusted party 710 is the issuing bank of the payment card. An authenticating password, token, or other authenticating mechanism allows trusted party 710 to authenticate the identity of a presenter 708 since only trusted party 710 and presenter 708 know the password, token, or other authenticating mechanism.

During the enrollment process, the presenter should present the trusted party with enrollment data, authentication data, and profile data. Enrollment data is required to verify the presenter's identity so that the trusted party can be assured that the correct person is being enrolled as an eligible and participating presenter. Authentication data will be required to authenticate the presenter during a subsequent transaction using the techniques of the present invention. Examples of authentication data include passwords, chip cards, biometrics, etc. It should be understood that the various types of authentication data as discussed in this document can be interchangeably utilized. If not already on file with the trusted party, profile data will be required to validate and/or provision profile data during a subsequent transaction using the techniques of the present invention.

The presenter enrollment process can occur in a variety of manners. For instance, the enrollment process can take place online, in a person-to-person interaction, a telephone conversation, or through the mail. An online enrollment process can involve a presenter who visits an enrollment website to provide the necessary information to obtain a program identity number and an authenticating mechanism.

Data Authentication Services Transaction

Figure 2:
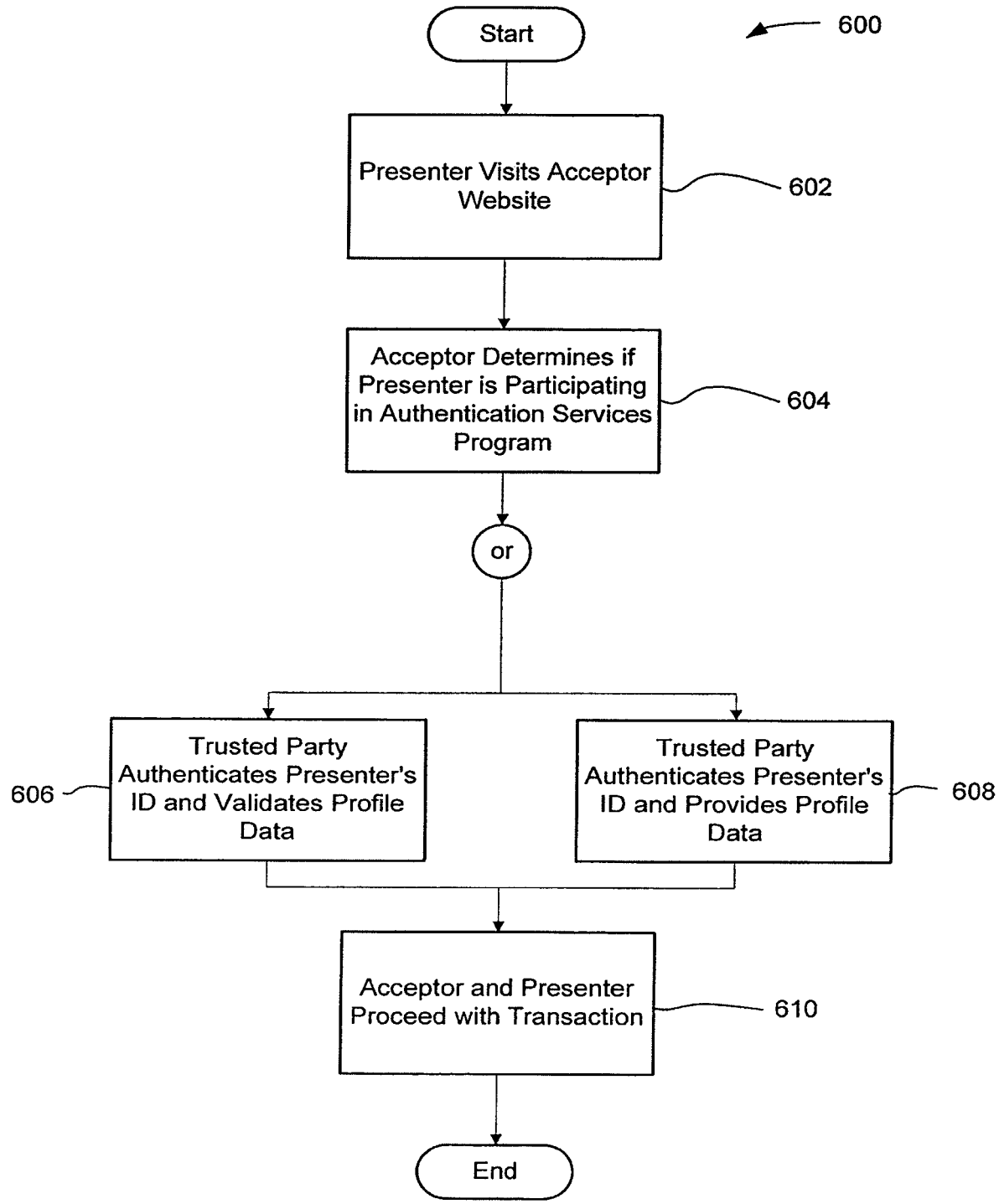
FIG. 2 illustrates a flow diagram that describes the data authentication services process according to one embodiment of the present invention.

FIGS. 1 and 2 will now be described in tandem to describe the process for authenticating data according to one embodiment of the present invention. The data authentication services are provided through the "data authentication services program." FIG. 2 describes a flow diagram 600 from a high-level point of view and FIG. 1 describes the specific message flows that occur simultaneously. As mentioned earlier, FIG. 1 shows the message flows on top of the system architecture 700.

The data authentication services program can be used in a variety of situations where an acceptor desires to authenticate information presented by a presenter. For instance, in one of the situations a presenter can visit a government website (which is the acceptor website) in order to fill out an application for a small business license. Various government agencies offer online services through their websites, which help reduce operation costs and provide citizens with increased accessibility to government services. Typically, a government agency desires to confirm the information entered by the individual (a presenter), such as name, name of business, address, and the like. The following example, described through FIGS. 1 and 4, describe operation of the data authentication services program through the situation where a potential customer applies for car insurance by visiting a website of a car insurance provider.

FIG. 2 begins at block 602 when a presenter visits a website of an acceptor. Block 602 is represented as step "a" in FIG. 1. To apply for such insurance coverage, the potential customer or presenter 708 visits the car insurance provider or acceptor 716 website to fill out an application form. Such an application form may request a wide range of data relating to car insurance policies. For example, the application form can request data such as name, address, birth date, driver's license data, make, model, and year of vehicle, current insurance status and terms, current insurance provider, policy terms desired, traffic violation history, and the like. In this example, trusted party 710 is a bank of which presenter 708 is a customer.

Acceptor 716 desires to authenticate the information supplied in the application form so that acceptor 716 can properly provide a price quote or determine whether to offer an insurance policy to presenter 708, what terms to offer to presenter 708, and various other matters.

If presenter 708 desires to use the authentication services program, then presenter 708 enters his or her program identity number. Presenter 708 supplies his or her program identity number to acceptor 716 at the same time presenter 708 fills out the form.

In block 604, acceptor checks to see if presenter is participating in "the data authentication services program." In one implementation, checking the participation status of a presenter is a two-phase process wherein directory 714 and then an access control server 712 are queried. Directory server 714 determines if the trusted party 710 with whom presenter 708 has a trusted relationship is participating within the data authentication services program. A presenter can use the data authentication services program only if a trusted party is willing to authenticate the identity of the presenter and to provide data services relating to the presenter. Then ACS 712 determines if the specific presenter 708 is enrolled with the services program.

These two-phases are broken into the individual steps 1-4 in FIG. 1. In FIG. 1, step 1 shows that acceptor server plug-in (ASPI) 718 sends a "service enrollment request message," SEReq message, to directory server 714 to determine presenter's eligibility for the authentication services program. The SEreq message specifies the particular services which acceptor 716 is requesting be performed on presenter 708.

The SEReq message identifies the program identity number of presenter 708 and queries directory server 714 to verify that the program identity number is within a range of numbers associated with a trusted party that is participating with the data authentication services program. If the program identity number does not fall within a range of program identity numbers defined on directory server 714, then trusted party 710 and thereby presenter 708 are not enrolled. In this case, acceptor 716 is notified that the program identity number is not enrolled and ASPI 718 returns control of the transaction back to acceptor 716. At this point, acceptor 716 can proceed with the transaction either by refusing further service to presenter 708 or by proceeding with the transaction in another manner.

On the other hand, if the program identity number is determined to be within a range of program identity numbers present in directory server 714, then the second phase of the verification process begins. The second phase begins when the SEReq message is forwarded to an appropriate presenter access control server (ACS) 712 to determine whether the requested data services are available for presenter 708. Data authentication services are available for a specific presenter when a presenter's program identity number is enrolled with the data authentication services program. If the program identity number is not enrolled, then the data services are not available and the acceptor can determine how it would like to proceed with the transaction. When ACS 712 indicates that the program identity number is enrolled, the ACS via the directory server provides the ACS URL Internet address to ASPI 718.

In another implementation, verifying that a presenter 702 is enrolled is performed by having ASPI 718 directly query the ACS without first querying the directory server. In yet another implementation, acceptor 716 has a cache memory containing the same information held at directory server 714. In this manner, acceptor can perform the first phase of the enrollment determination. In other words, ASPI 718 can use the cache memory to determine if a presenter's program identity number is within the range of program identity numbers in a directory server. The cache memory does not indicate if an ACS can provide service for a presenter nor does it identify the ACS.

Multiple ACS's 712 can exist within the authentication system 700. Each ACS 712 manages the authentication of certain presenters 708. For instance, an ACS 712 maintained by a certain presenter bank 710 may only be suitable for authenticating profile data supplied by presenters who are also customers of that specific presenter bank.

In step 3 after ACS 712 determines whether authentication services are available to the specific presenter 708, ACS 712 responds to directory 714 with a service enrollment response (SERes) message indicating the status of the presenter account and the availability of the specific services requested by acceptor 716.

In step 4 directory 714 then forwards the SERes message to ASPI 718. When ASPI 718 receives indication from the SERes message as to whether presenter 708 is enrolled and able to use data authentication services, acceptor 716 can determine how to proceed with the transaction with presenter 708. If presenter 708 is not enrolled or not able to use the services, then acceptor 716 can decide to either terminate the transaction with presenter 708 or to proceed with the transaction in some other manner without using the data authentication services.

However, if presenter 708 is enrolled and able to use the services, then the transaction process proceeds to block 606 or 608 in FIG. 2. This corresponds to step 5 in FIG. 1. Block 606 represents the processes wherein trusted party 710 authenticates profile data provided by presenter 708. Block 608 represents the processes wherein trusted party 710 authenticates the identity of presenter 708 and then provides specific profile data to acceptor 716. The following description describes block 606.

The processes of block 606 breakout into steps 5 through 9 of FIG. 1. In steps 5 and 6, ASPI 718 sends a data authentication request message, a DAReq message, to the appropriate trusted party ACS 712 by sending the DAReq message to presenter 708 who then forwards the DAReq message to ACS 712. Step 5 represents the transmission of the DAReq message from acceptor 716 to presenter 708 and step 6 represents the transmission of the DAReq message from presenter 708 to ACS 712. The DAReq message includes the profile data provided by presenter 708. As described earlier, the program identity number was sent to ACS 712 as part of the SEReq message. Upon receipt of the DAReq message by ACS 710, ACS will have the profile data to perform authentication services.

In the alternative block 608, which also breaks out into steps 5 through 9, DAReq message includes a list of data elements that acceptor 716 desires to be provided by trusted party 710.

Step 7 represents the interaction and messages that are exchanged between presenter 708 and ACS 712 when trusted party 710 desires to authenticate the identity and validate the profile data of presenter 708. For example, this interaction begins when trusted party 710 sends a message to presenter 708 that informs presenter 708 that acceptor 716 desires trusted party 710 to authenticate the profile data submitted by presenter 708. Trusted party 710 indicates that presenter 708 should provide its authentication password (or token) to trusted party 710 so that trusted party 710 can proceed with the authentication process. The authentication password should have been established between presenter 708 and trusted party 710 during the enrollment process. The authentication password allows trusted party 710 to confirm that the actual presenter 708 (and not an imposter) desires to have trusted party 710 authenticate the profile data received by acceptor 716 in block 602 (step a). In other words, when a presenter 708 enters the proper password, authentication system 700 can confirm that the actual presenter 708, and not an imposter, entered his or her own profile data on the form provided at the acceptor's website. The use of a password allows for a trusted party to provide a definite answer with regards to the authenticity of the presenter's identity. In some embodiments, step 7 also involves asking presenter 708 for permission to validate or provision the presenter's profile data.

If ACS 712 determines that presenter 708 provided the incorrect authentication password, ACS 712 can ask presenter to reenter the authentication password. If presenter 708 is unable to enter the correct password, then ASPI 718 will be informed that the identity and profile data cannot be authenticated. However, if ACS 712 determines that the correct authentication password was provided, then ACS 712 performs the requested data services.

Provision of the correct password (which correlates to the program identity number) allows authentication system 700 to authenticate the identity and validate the profile data of presenter 708. Identity authentication confirms the identity of the presenter while profile validation confirms that the profile data provided by presenter 708 to acceptor 716 actually corresponds to presenter 708. The ACS can authenticate each data element of the profile data individually. For instance, ACS 712 can provide an authentication determination regarding each of a name, address, birth date, and other such data.

Profile validation verifies the accuracy of the profile data provided by presenter 708 to acceptor 716. For example, ACS 712 can verify if the correct data has been provided for each type of requested profile data by comparing the data to reference data already stored by trusted party 710. In one embodiment, profile validation is performed during a payment authorization process to verify the address of a presenter. Profile validation of address information is often referred to as an "address verification service."

With the profile data provisioning service, ACS 712 provides profile data to acceptor 716 so that presenter 708 doesn't have to go through the tedious steps of providing the data him or herself in step a. This can be advantageous because the possibility of human error during the data entry process can be avoided and because it simplifies the steps that presenter 708 must take in providing data to acceptor 716. In this situation, presenter 708 only provides identifying data and his or her program identity number. Acceptor 716 then requests trusted party 710 to authenticate the identity of presenter 708 and to provide profile data of presenter 708. Then trusted party 710 informs presenter 708 that acceptor 716 requests that trusted party 710 provide it with the profile data of presenter 708. Trusted party 710 typically will also ask presenter 708 for permission to provide certain profile data of presenter 708 to acceptor 716. The ACS-provided profile data can be sent back to ASPI 718 through a data authentication response message as shown in step 8.

Another data service supported by the data services system of the present invention is a profile data updating service. This service does not involve presenter 708 and no presenter identity authentication is performed. This service occurs in the scenario when an acceptor already has profile data of the presenter and desires to obtain updated profile data. One implementation of the profile data updating service, referred to as "an account updating service," involves sending an acceptor party updated account information from a trusted party. Account information pertains to data that identifies an account held by a presenter. For instance, an account number is account information that identifies a payment account (e.g., credit or debit card account) that a presenter uses to purchase goods and services. In one scenario, a payment card account of a presenter has expired and a new payment card account has been issued to the presenter. An acceptor requests updated account data from the trusted party and the trusted party sends the updated account data to the acceptor.

Profile data correction service corrects errors in the profile data provided by a presenter. In some cases, a presenter enters profile data with typographical errors. In these cases, the data service can correct the typographical errors.

ACS 712 can use various techniques for authenticating the identity of the presenter. The use of passwords as described above is just one of the possible techniques. Other techniques include public key infrastructure (PKI), chip cards, biometrics, and password lists.

During the interaction of step 7, there may be additional exchange of messages between presenter 708 and trusted party 710 relating to privacy laws. For example, trusted party 710 may need to obtain the permission of presenter 708 to proceed with authenticating or provisioning of the profile data at issue. Profile data stored by ACS 712 will not be shown to presenter 708 or acceptor 716 unless presenter 708 provides trusted party 710 with the correct password.

In step 8, after the appropriate data services have been processed, ACS 712 formats a data authentication response message (DARes) with appropriate values and signs it with a digital signature. The DARes message is then sent to presenter 708. The DAres message includes the data requested, by acceptor 716. This data can include indications as to the authenticity of identity, validity of profile data, or it can include provisioned data.

In step 9, the DARes message is then forwarded from presenter 708 to ASPI 718. ASPI 718 then validates the digital signature of the DARes message. At this point acceptor 716 finds out if presenter 708 supplied authentic and correct profile data. Acceptor 716 will then typically proceed with the transaction if such profile data is authentic and correct, as represented in block 610 of FIG. 2 and step b of FIG. 1. In the example provided, acceptor 716, the car insurance provider can decide if it will provide an insurance price quote or a policy to presenter 708.

In some embodiments, the DAReq and the DARes messages can be sent between ACS 712 and ASPI 718 directly rather than through presenter 708. In one embodiment, the DAReq and DARes messages are sent to each other over the Internet. This is appropriate in instances when the data services are being used without presenter involvement, such as for a service that involves account data updating.

It should be understood that all messages described in FIG. 1 can be encrypted to increase the level of security.

The present invention can also be implemented when a presenter accesses the data authentication services program when using mobile devices. The processes and system of the present invention supports mobile devices that send messages over the Internet, voice channels, and text messaging channels.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

We claim:

1. A method involving a presenter, a trusted party, and an acceptor for validating profile data of said presenter during an on-line transaction comprising:
   determining that the presenter is enrolled in an authentication program;
   after determining that presenter is enrolled in the authentication program, receiving said profile data of said presenter from the acceptor, which is a merchant, by an access control server at said trusted party;
   receiving, at said access control server, authenticating data from said presenter, wherein the authenticating data allows the access control server to authenticate an identity of the presenter;
   authenticating, by said access control server, said identity of said presenter for the benefit of acceptor by comparing said authenticating data against pre-designated authenticating data previously designated for said presenter;
   validating, by said access control server, said profile data of said presenter for the benefit of said acceptor by comparing said profile data of said presenter against reference data stored by said trusted party; and
   notifying, by said access control server, said acceptor that an identity of said presenter is either authentic or erroneous and that said profile data of said presenter is either authentic or erroneous.

2. A method as recited in claim 1 wherein said notifying operation further comprises:
  notifying said acceptor, by said access control server, that said identity is authentic when said authenticating data received from said presenter matches the pre-designated authenticating data; and
  notifying said acceptor, by said access control server, that said profile data is authentic when said profile data matches said reference data.

3. A method as recited in claim 1 wherein the presenter communicates with said trusted party and said acceptor over the Internet.

4. A method as recited in claim 3 wherein said trusted party and said acceptor communicate through the Internet.

5. A method as recited in claim 1, wherein the following operations occur prior to the operations of claim 1:
  receiving, by said access control server, authenticating information from said presenter; and
  storing said authenticating information as said pre-designated authenticating data.

6. A method as recited in claim 5 further comprising:
  providing, by said access control server, to said presenter a program identity number which is correlated with said identity, said profile data, and said pre-designated authenticating data; and
  storing said program identity number.

7. A method as recited in claim 6 wherein said program identity number is an account number for a financial account of said presenter, and wherein said trusted party is a financial institution that maintains said financial account.

8. A method as recited in claim 1 further comprising:
  receiving, by said access control server, a query as to whether said identity of said presenter can be authenticated and whether said profile data of said presenter can be validated by said trusted party.

9. A method as recited in claim 8 further comprising:
  receiving, by said access control server, a query from said acceptor as to whether account data updating can be provided.

10. A method as recited in claim 8 wherein receiving the query comprises receiving, by said access control server, a service enrollment request message from said acceptor via a directory server.

11. A method as recited in claim 10 wherein said service enrollment request message includes a program identity number.

12. A method as recited in claim 8 further comprising:
  informing, by said access control server, said acceptor as to whether said identity of said presenter can be authenticated and whether said profile data of said presenter can be validated by said trusted party.

13. A method as recited in claim 1 further comprising:
  receiving, by said access control server, a data authentication request message from said acceptor, wherein the data authentication request message requests that said trusted party authenticate said identity and validate said profile data of said presenter.

14. A method as recited in claim 13 wherein said data authentication request message is transmitted from said acceptor to said access control server via said presenter.

15. A method as recited in claim 13 wherein said data authentication request message includes said profile data originally provided to said acceptor from said presenter.

16. A method as recited in claim 13 wherein said notifying said acceptor that an identity of said presenter is either authentic or erroneous is executed by transmitting a data authentication response message by said access control server to said acceptor, wherein said data authentication response message is transmitted from said access control server to said acceptor via said presenter.

17. A method as recited in claim 1 further comprising:
  providing, by said access control server, updated profile data to said acceptor when said profile data is determined to be out of date, wherein the updated profile contains account data.

18. A method as recited in claim 1, further comprising:
  receiving, by said access control server, permission from said presenter to proceed with said validating of said profile data before notifying said acceptor that said profile data of said presenter is either authentic or erroneous.

19. A method as recited in claim 17, further comprising:
  receiving, by said access control server, permission from said presenter to proceed with said providing of said updated profile data before providing said updated profile data to said acceptor.

20. The method according to claim 1, wherein the pre-designated authenticating data comprises a program identity number of the presenter.

* * * * *